Nov. 9, 1954 G. C. TOOTILL 2,693,907

ELECTRONIC COMPUTING CIRCUITS

Filed Jan. 3, 1950 2 Sheets-Sheet 1

Geoffrey Colin Tootill

Inventor

By Morrison & Hall

Attorneys

Nov. 9, 1954 G. C. TOOTILL 2,693,907

ELECTRONIC COMPUTING CIRCUITS

Filed Jan. 3, 1950 2 Sheets-Sheet 2

Geoffrey Colin Tootill

*Inventor*

By Morris & Hall

*Attorneys*

United States Patent Office 2,693,907

Patented Nov. 9, 1954

2,693,907

ELECTRONIC COMPUTING CIRCUITS

Geoffrey C. Tootill, Shrivenham, England, assignor to National Research Development Corporation, London, England, a British corporation Application January 3, 1950, Serial No. 136,441

Claims priority, application Great Britain January 17, 1949

14 Claims. (Cl. 235—61)

The present invention relates to electronic circuits for binary-digital computation and more particularly to such circuit arrangements for performing the process of addition of two binary digital numbers in the series mode, i. e. binary numbers, each of which is representable in the dynamic form as a temporal series of electrical signals.

Addition is the fundamental arithmetical operation in digital computation as it can be shown that all other arithmetical work can be reduced to simple addition and subtraction operations, and that subtraction, in its turn, can be treated as addition by the use of complementary numbers. In the process of addition of two binary digital numbers, A and B, in the series mode, the numbers to be added are considered digit by digit, beginning with the least significant digits, and a separate operation is performed involving each pair of corresponding digits. During the addition the $n$th digit of the sum is dependent on not only the $n$th digits of the numbers A and B but also upon the less significant digits of the numbers. The effect of these less significant digits may be represented by the digit of a third number, made up of the "carried" units which are produced in the course of the series of operations comprising the process of addition. At each step of the addition process therefore, it is necessary to take the corresponding digits A and B of the two numbers A and B and also the carry digit $C_D$ derived from the preceding step and to determine from these three digits whether the corresponding digit in the answer number $A+B$ is a "0" or a "1" and also whether or not there is a "1" digit C to be multiplied by 2, i. e. carried forward, to become the digit $C_D$ for the next stop of the process.

The table indicates the significances of the digit in the sum $A+B$ and of the digit C for the eight possible combinations, 1 to 8 of the digits A, B and $C_D$ which may occur at each step of the addition process. Column 5 of the table indicates the number of "1's" occurring in the group of corresponding digits A, B, $C_D$ for each of the eight combinations. It will be seen that each value 0, 1, 2 and 3 for the number of "1" digits in the groups A, B, $C_D$ corresponds to a unique combination of the result digits $A+B$ and C. (In systems of this type a digit "1" is represented by a pulse and a digit "0" by the absence of a pulse.)

*Table*

| Combination | A | B | $C_D$ | $A+B+C_D$ | $A+B$ | C |
|---|---|---|---|---|---|---|
| 1 | 0 | 0 | 0 | 0 | 0 | 0 |
| 2 | 0 | 0 | 1 | 1 | 1 | 0 |
| 3 | 0 | 1 | 0 | | | |
| 4 | 1 | 0 | 0 | | | |
| 5 | 0 | 1 | 1 | 2 | 0 | 1 |
| 6 | 1 | 0 | 1 | | | |
| 7 | 1 | 1 | 0 | | | |
| 8 | 1 | 1 | 1 | 3 | 1 | 1 |

One known method of performing the process of addition of binary-digital numbers relies upon the fact that the digits of the input numbers A, B and $C_D$ affect the answer equally and that therefore the appropriate significances for the answer digits $A+B$ and C may be obtained by determining, by a counting process, how many of the digits A, B and $C_D$ are "1's." The counting may be performed by a digital process, which implies that the pulses representative of the digits are arranged to be noncoincident in time, or may be performed by an analogue method. Adding circuit arrangements of the type described in patent application Serial No. 141,176, filed January 30, 1950, F. C. Williams et al. and Serial No. 105,352, filed July 18, 1949, F. C. Williams et al., operate by the analogue counting method. In the analogue type of counter the A, B, and $C_D$ pulses are arranged to occur simultaneously at a standard level and are added in amplitude, the number of "1's" being determined by observation of the amplitude of the combined signal. This method of counting enables all three input signals to be considered at the same time and the output ($A+B$ and C) signals to be produced immediately (apart from the natural delay caused by circuit time constants). An adding circuit based upon the analogue counting method however requires circuits which are critically adjusted to produce amplitude stabilized pulses and to effect the necessary amplitude discrimination for the counting operation.

It is the object of the present invention to provide a binary-digital adding circuit of the type referred to, which is adapted to operate with numbers, the corresponding digits of which occur simultaneously, but which does not require the maintenance of the critical circuit operating conditions necessary for the successful operation of adding circuits operation by the analogue counting method.

It is a further object of the invention to provide an adding circuit of the type referred to which functions by performing a sequence of logical operations between digital pulses, in such a fashion that the requirements for the production of desired answer digits $A+B$ and C, corresponding to input digits A, B and $C_D$ are obeyed.

It is a further object of the invention to provide a binary-digital circuit which is built up only of circuits arranged to perform the logical operations corresponding to the logical concepts of "AND," "OR" and "NOT" as defined below.

Logical operations are the simplest kind of operations which can be carried out on numbers, and are those operations in which the $n$th digit in the resulting number depends only on the $n$th (coincident) digit or digits of the numbers operated upon. The simplest positive logical operation which can be performed on a single binary-digital number is to change the significance of each digit, i. e. to replace each "1" by "0" and vice versa. This operation corresponds to the logical concept "NOT," the result of the operation performed on a number or single digit A is referred to as "NOT A" and the device performing the operation being referred to as a "NOT device" or a "negator."

The other two logical operations which are employed in the present invention are those corresponding to the logical concepts of "AND" and "OR." The "AND" device is in effect a gate circuit which provides an output digit of one significance when corresponding digits of like significance occur simultaneously in each one of several applied pulse trains representative of binary-digital numbers. The "AND" device may be referred to simply as a gate circuit. The "OR" device is a buffer circuit which provides an output digit pulse whenever a digit pulse occurs on at least one of a plurality of input circuits, interaction between the input circuits being eliminated by the nature of the buffer circuit.

According to the present invention there is provided a circuit arrangement for producing from two input pulse trains (A) and (B), each representing by its succession of pulses the digits of a binary number and fed thereto on separate lines simultaneously digit by digit, a final output pulse train ($A+B$) representing by its succession of pulses the digits of the binary sum of the two numbers, the said circuit arrangement comprising a first gate circuit fed with trains (A) and (B) to produce a carry-digit pulse (C) whenever pulses representing the digit "one" occur simultaneously in trains (A) and (B), a delay circuit fed with and arranged to delay by one digit period said pulses (C) to produce a third input pulse train ($C_D$), means including a second gate circuit fed with train ($C_D$) to produce a pulse (C) whenever a pulse in the train ($C_D$) occurs simultaneously with a pulse representing the digit "one" in either of trains (A) or (B), a negator device fed with pulses (C) from said first and second gate circuits to produce an output pulse whenever no pulse (C) is applied thereto, a third gate circuit and a buffer circuit each fed from the three input trains A, B and $C_D$ to produce respectively an output pulse when pulses representing the digit "one" occur either simultaneously in all three trains or in any one of the trains, and a final output circuit, including a fourth gate circuit, fed from said negator device, a third gate circuit and a buffer circuit to produce said final output pulse $(A+B)$ whenever an output pulse from said buffer circuit occurs simultaneously with an output pulse from either said negator device or said third gate circuit.

According to the present invention there is also provided the method of producing from two input pulse trains (A) and (B), each representing by its succession of pulses the digits of a number, a final output pulse train $(A+B)$ representing by its succession of pulses the digits of the binary sum of the two numbers, by deriving a carry digit pulse (C) from trains (A) and (B) whenever pulses representing the digit "one" occur simultaneously in trains (A) and (B), delaying said pulse C by one digit period to produce a third input pulse train ($C_D$), deriving a pulse C whenever a pulse in the train ($C_D$) occurs simultaneously with a pulse representing the digit "one" in either of trains (A) or (B), deriving a first output pulse train by generating a pulse on each occurrence of no pulse C, deriving a second output pulse train by generating a pulse on each simultaneous occurrence of a digit "one" in all three input pulse trains (A), (B) and ($C_D$), deriving a third output pulse train by generating a pulse on each occurrence of a digit "one" in any one input train and deriving a final output pulse train representing the sum $(A+B)$ by generating a pulse on each simultaneous occurrence of a pulse from said third output pulse train with a pulse from either said first or said second output pulse trains.

Figures 1, 2:
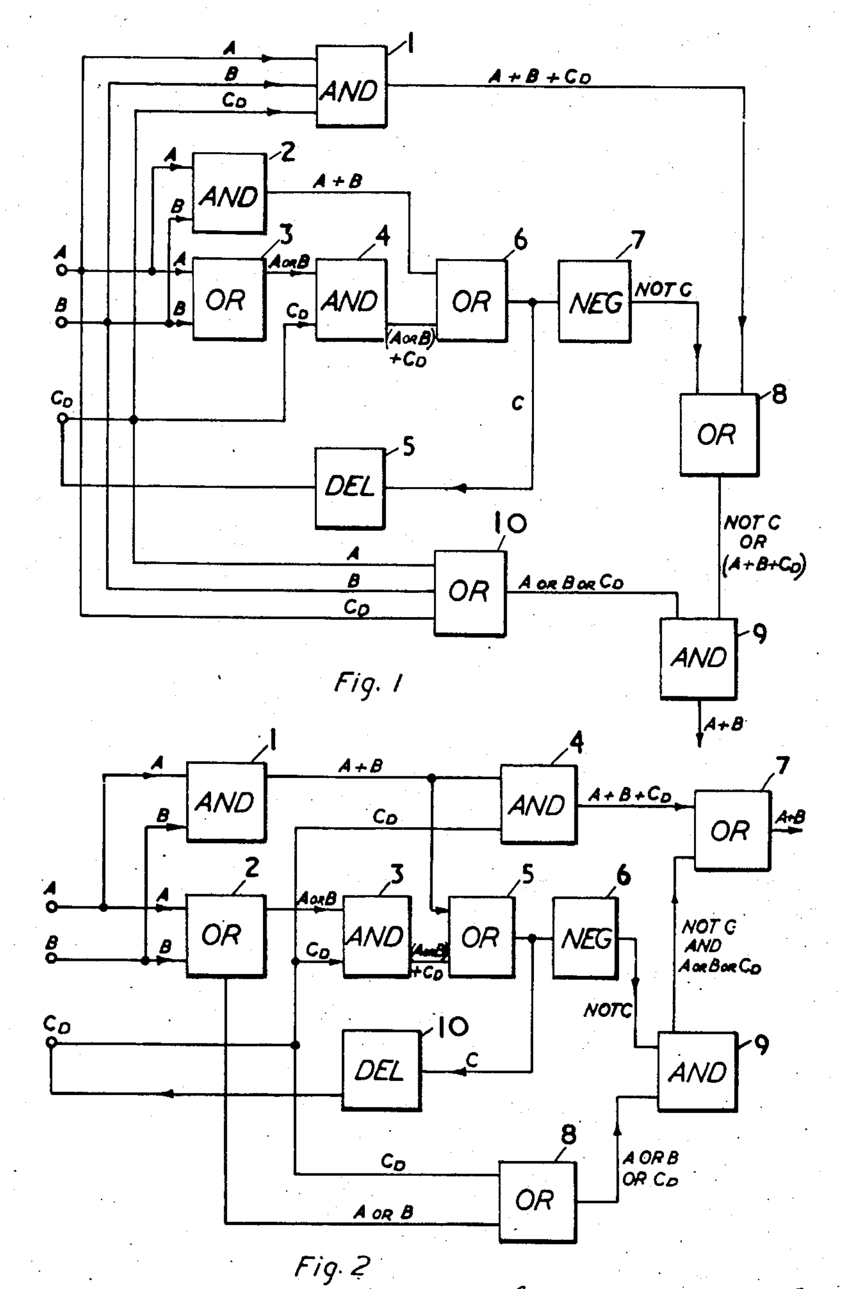
Figure 1 illustrates a logical diagram of one embodiment of the invention.
Figure 2 illustrates a further logical diagram of a second embodiment of the invention.

In Figure 1 it will be seen that the binary digital pulse trains to be added are fed simultaneously on separate lines digit by digit to an "AND" gate 1, "AND" gate 2, "OR" gate 3, and "OR" gate 10. The inputs A and B fed to the "AND" gate 2 produce an output whenever a pulse representing a digit 1 is present in both input pulse trains A and B. Similarly a pulse will be produced at the output of "OR" gate 3 whenever a pulse representing a digit 1 is present in either input pulse train A or input pulse train B. The output of "OR" gate 3 is applied to "AND" gate 4 together with a carry-digit pulse which may be present as a result of a previous operation. "AND" gate 4 therefore produces an output whenever there is a pulse representing a digit 1 in either the A or B pulse trains and also a pulse representing a digit 1 in the $C_D$ (carry-digit) pulse train. The output from "AND" gate 4 and "AND" gate 2 are both fed to the "OR" gate 6 which produces an output whenever a pulse from either "AND" gate 2 output or "AND" gate 4 output is present at its input. The output pulse from the "OR" gate 6 is fed into a delay circuit which delays the pulse for one digit period and this delayed pulse is one pulse in the pulse train $C_D$ which is fed to the "AND" gate 4, the "AND" gate 1 and the "OR" gate 10. The output from "OR" gate 6 is also fed to a negator device which produces an output pulse whenever there is no pulse at its input. An output pulse from the negator device therefore represents a case of "NOT C" where C is the output pulse from the "OR" gate 6.

"AND" gate 1 is fed with pulse trains $\overline{A, B}$ and $C_D$ and produces an output whenever a pulse representing a digit 1 occurs in all three input pulse trains. The output from "AND" gate 1 is fed together with the output from the negator 7 to "OR" gate 8 which gate produces an output pulse whenever either a pulse representing $(A+B+C_D)$ or a pulse representing "NOT C" is present at its input.

The "OR" gate 10 is fed with the three input pulse trains A, B and $C_D$ and produces an output pulse whenever a pulse representing a digit 1 is present in either A or B or $C_D$ input pulse trains. The "AND" gate 9 is fed with the outputs from "OR" gate 8 and "OR" gate 10 and produces an output pulse whenever a pulse representing digit 1 is present in the output of "OR" gate 10 and that of the output of "OR" gate 8 (representing A or B or $C_D$ and "NOT C" or $\overline{A+B+C_D}$). The output from the "AND" gate 9 represents by its succession of pulses the digits of the binary sum of the two numbers represented by the pulse trains A and B.

An alternative embodiment of the invention is shown in Figure 2. In this embodiment the pulse trains A and B are fed simultaneously digit by digit on separate lines to the "AND" gate 1 and to the "OR" gate 2. The "AND" gate 1 produces an output pulse whenever a pulse representing digit 1 is present in both input pulse trains. This output is applied to the input of "AND" gate 4 and "OR" gate 5. A pulse representing a carry digit $C_D$ (produced from a previous step) is also applied to the "AND" gate 4 which produces an output whenever a pulse representing $A+B$ and a pulse representing $C_D$ is present at its input. The "OR" gate 2 produces an output pulse whenever a pulse representing a digit 1 is present in either of input trains A or B and this is applied together with the $C_D$ pulse to the "AND" gate 3. The output of the "AND" gate 3 representing $\overline{\text{A or B}}$ plus $C_D$ is applied together with the output of $\overline{\text{"AND"}}$ gate 1 to the "OR" gate 5 which produces a pulse "C" whenever a pulse representing $\overline{\text{A or B}}$ or $C_D$ is present at its input. This output pulse $\overline{C}$ is applied to a negator device 6 and a delay device 10. The negator device 6 produces a pulse representing "NOT C" whenever it has no pulse at its input and this pulse representing "NOT C" is applied to the "AND" gate 9. The delay device 10 produces the carry-digit pulse $C_D$ referred to above. The "OR" gate 8 is fed with the carry-digit pulse and the output from the "OR" gate 2 representing A or B. "OR" gate 8 therefore produces an output pulse whenever A or B or $C_D$ is present at its input and this output pulse is applied together with the "NOT C" pulse to "AND" gate 9 which produces an output whenever the "NOT C" pulse and $\overline{\text{A and B or } C_D}$ is present at its input. The output pulse from "AND" gate 9 is applied together with the output pulse from "AND" gate 4 to the "OR" gate 7 which produces an output whenever it has one input pulse only. The output of the "OR" gate 7 by its succession of pulses the digits of the binary sum of the two numbers represented by the two input pulse trains A and B.

Figures 3, 4:
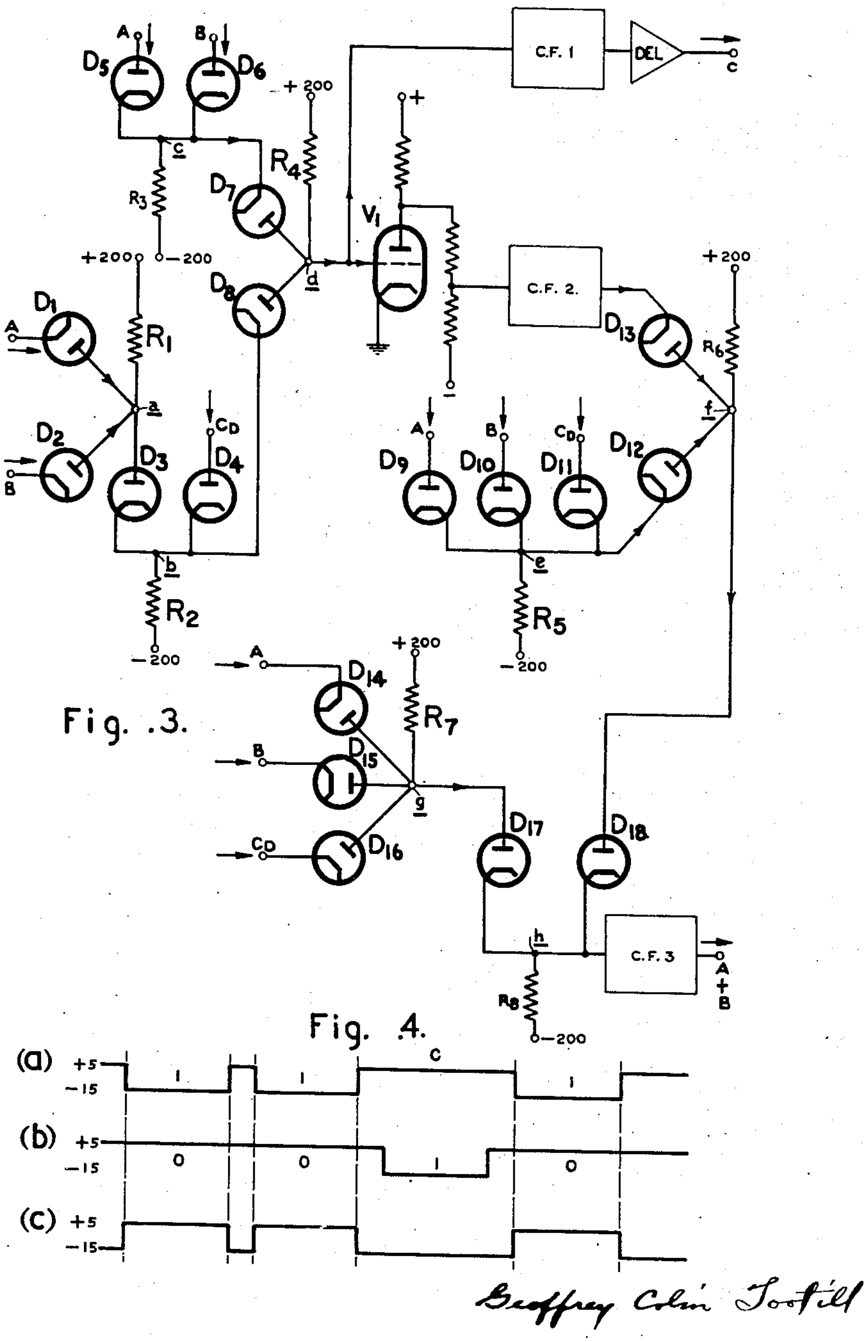
Figure 3 illustrates a circuit diagram of an adding circuit according to the invention.
Figure 4 shows the waveforms associated with the operation of the negator device (valve D1 of Figures 1 and 3).

Figure 3 illustrates the circuit diagram of the adding circuit. The various input terminals of the circuit are indicated by the references A, B, $C_D$ corresponding to the digit pulses A, B of the numbers $\underline{A}$ and $\overline{\underline{B}}$ to be added and the carry digit pulse $C_D$, derived from the preceding step of addition, which are fed to these terminals. The pulses representing digits of significance "1" are arranged to be negative-going with a peak potential of −15 volts while the resting level of the pulse wave corresponding to digits of significance "0" is a potential of +5 volts. The adding circuit comprises two main portions; a first part consisting of two gates or AND devices and two buffers or OR devices, which derives from the digit pulses A and B and the carried digit pulse $C_D$ the pulse representative of the digit C to be carried, and a second part coupled to the first part by a NOT device or negator, and comprising two OR devices and two AND devices, which generates the sum or answer digit pulse $A+B$.

In the first portion of the adder circuit the first OR device consists of the diodes $D_1$ and $D_2$, to the cathodes of which are fed the A and B pulses while the anodes of the diodes are connected in parallel and through resistor $R_1$ to a source of positive potential (+200 volts). The first AND device comprises the two-diode gate $D_3$, $D_4$, the anode of $D_4$ being fed with the carry-digit pulse $C_D$ while the anode $D_3$ is fed with the output potential at point *a* from the first OR device. The common cathode connection of $D_3$ and $D_4$ is connected to a source of negative potential (−200 volts) through resistor $R_2$, the output being obtained at point *b*. The second AND device comprises the diodes $D_5$, $D_6$ to the anodes of which are fed A and B pulses, the common cathode output point *c* being returned to the negative potential source via resistor $R_3$. The second OR device comprises the diodes $D_7$, $D_8$, the cathodes of which are fed with the potentials at the output points *b* and *c* of the preceding AND devices the common anode point $d$ being returned to the positive potential source via resistor $R_4$.

In the resting condition when no A, B or $C_D$ pulse is present, the potentials at points $a$, $b$, $c$ and $d$ are all held at approximately +5 volts, the diodes $D_1$–$D_8$ all being in the conductive condition if the potentials at all the input terminals A, B and $C_D$ are held accurately at +5 volts by the input waveforms which are provided by low impedance sources. When an A or B digit pulse occurs the potential at point $a$ is reduced to −15 volts, the anode voltage of diode $D_3$ falling similarly. If a $C_D$ pulse exists coincidentally with the A or B pulse then the anodes of both diodes $D_3$ and $D_4$ will fall to −15 volts so that an output pulse (negative—going to approximately −15 volts) will be obtained at point $b$ representative of (A or B) and $C_D$. Inspection of the table will show that this pulse will thus occur for those combinations 5, 6 and 8 of the digits A, B and $C_D$ which result in the production of a carry-digit pulse C.

Similarly if an A and B digit pulse occur coincidentally the potential at point $c$ will fall to −15 volts approximately, a negative going pulse representative of A—B being produced at point $c$. Inspection of the table will show that such a pulse occurs for the combination 7 and 8, both of which require the production of the carry-digit pulse C. A negative-going pulse will thus be obtained at the output point $d$ of the second OR device $D_7$, $D_8$, $R_4$ representative of the conditions (A and B) or [$C_D$ and (A or B)] corresponding to the combinations 5, 6, 7 and 8 of the table which require the production of the carry digit C. A pulse occurring at point $d$ is thus fed as the carry-digit pulse C to a delay device (DEL) through cathode follower unit C. F. 1 to produce carry digit $C_D$ delayed by one digit period. The delay device may be of any conventional type e. g. a delay line or mercury delay tube or of the type described in copending U. S. Patent application Ser. No. 132,579, filed December 12, 1949, by Arthur A. Robinson, and now Patent No. 2,685,407, issued August 3, 1954.

The carry digit pulse C at point $d$ is also fed to the negator or NOT device comprising the valve $V_1$. The operation of this valve $V_1$, which functions as a simple inverting stage, as a negator may be understood by reference to the wave form of Figure 4. The waveform at ($a$) of Figure 4 represents a train of digit pulses such as 1, 1, 0, 1, the "1" pulses being 20 volts negative going from a "0" or resting level of +5 volts. At Figure 4($b$) is indicated the true "NOT" version of the wave of Figure 4($a$) the wave being representative of the digits 0, 0, 1, 0. The significant characteristic of the wave at Figure 4($a$) or ($b$) is the voltage level of the wave during any digit pulse interval and it can be seen that the wave of Figure 4($c$), which is merely the inverted form of the wave of Figure 4($a$), has, during each digit pulse interval the same voltage level as the true NOT wave of Figure 4($b$); and will therefore operate in exactly the same way as the true NOT wave. The output from the negator is obtained from a tapping point on a potential divider connected from the anode of $V_1$, to a source of negative potential, the anode $V_1$ being connected through a suitable resistor to a positive potential source, so that the output potential level corresponds to the standard levels for the input waves, being +5 when $V_1$ is cut off (corresponding to a "1" pulse at point $d$) and being −15 volts when $V_1$ is conducting (corresponding to a "0" pulse at point $d$). The output wave from the negator, which may be fed out through a cathode follower $CF_2$, thus provides a voltage level corresponding to the digit "1" for the combination 1, 2, 3 and 4 of the table when a carry digit pulse C is not required.

In the second portion of the adding circuit a first AND device comprises the three-diode gate $D_9$, $D_{10}$ and $D_{11}$, the anodes of diodes $D_9$, $D_{10}$, being fed with the A and B digit pulses and the anode of diode $D_{11}$, being fed with the $C_D$ carry digit pulse while the common cathode point $e$ is returned to the negative potential source via resistor $R_5$. Pulses at point $e$ are combined with the output from the negator in a first OR device comprising diodes $D_{12}$, $D_{13}$, the common anode point, $f$ of which is returned to the positive potential source via resistor $R_6$. A second OR device comprises the diodes $D_{14}$, $D_{15}$ and $D_{16}$ and the resistor $R_7$ which returns the common anode point $g$ to the positive potential source. The cathodes of diodes $D_{14}$–$D_{16}$ are fed with the A, B and $C_D$ digit pulses respectively. A final AND device comprises diodes $D_{17}$, $D_{18}$ and the resistor $R_8$ which connects the common cathode and output point $h$ to the negative potential source. The inputs to this final AND device are the digit pulses appearing at points $f$ and $g$.

As in the first part of the adder circuit the potentials at points $e$, $f$, $g$ and $h$ in the second part are at approximately +5 volts in the quiescent condition, all diodes $D_9$–$D_{18}$ are conducting if the potentials at the corresponding input terminals and at the output terminal of CF2 are held accurately at +5 volts. The AND device $D_9$, $D_{10}$, $D_{11}$, $R_5$ produces a negative going output digit pulse at point $e$ only when the A, B and $C_D$ pulses occur coincidentally. A negative going pulse at point $e$ thus represents A and B and $C_D$ and only occurs for the combination 8 of the table. The OR device $D_{12}$—$D_{13}R_6$ thus functions to produce a negative going digit pulse at point $f$ for the combinations 1, 2, 3, 4 and 8 of the table.

Similarly the OR device $D_{14}$, $D_{15}$, $D_{16}$, and $R_7$ gives a negative going output digit pulse when any one of the digit pulses A, B, and $C_D$ is present and the existence of such a negative pulse at point $g$ thus indicates the conditions A or B or $C_D$ and such a negative pulse will occur for any one of the combinations 2–8 of the table. The final AND device $D_{17}$, $D_{18}$, $R_8$ thus receives coincident digit pulses at its two input connections for the combinations 2, 3, 4 and 8 of the table only, the digit pulses occurring at point $f$ for combination 1 and at point $g$ for combinations 5, 6 and 7, being eliminated by the operation of the gate circuit. Negative going output pulses are thus produced at point $h$ for the combinations 2, 3, 4 and 8 of the table which represents those combinations under which the production of a sum or answer pulse $A+B$ is required. A cathode follower $CF_3$ may be provided to feed out the answer pulse from point $h$ to a utilization circuit as required.

The particular circuit arrangement illustrated in Figure 3 has been described by way of example only and the particular forms of AND or OR devices shown may be replaced by any suitable known form of gate or buffer circuits without departing from the scope of the present invention. Similarly the simple arrangement embodying the valve 1 for performing the function of a negator may be replaced by any other known circuit arrangement which will perform this function. For the actual circuit arrangement illustrated, the values indicated for the resistors $R_1$–$R_8$ are not critical so long as the requirements that $R_1<R_2<R_4$, $R_5<R_6<R_8$, $R_3<R_4$ and $R_7<R_8$ are complied with. If these conditions are not met then the AND and OR devices will be unable properly to drive the loads on their outputs.

I claim:

1. A circuit arrangement for producing from two input pulse trains (A) and (B), each representing by its succession of pulses the digits of a binary number and fed thereto on separate input lines simultaneously digit by digit, a final output pulse train ($A+B$) representing by its succession of pulses the digits of the binary sum of the two numbers, said circuit arrangement comprising a first coincidence gate circuit fed with trains (A) and (B) to produce at its output a pulse representing the digit "one" whenever pulses representing the digit "one" occur simultaneously in trains (A) and (B), a first buffer circuit including at least one thermionic tube with its input connected to both the (A) and the (B) input lines, a second coincidence gate circuit, circuit means connecting the output of said first buffer circuit to one input of said second coincidence gate circuit, a second buffer circuit including at least one thermionic tube, circuit means connecting the input of said second buffer circuit to the outputs of said first and second coincidence gate circuits, a delay circuit connected to the output of said second buffer circuit for delaying by one digit period the pulses (C) derived from said second buffer circuit, means for applying the delayed pulses ($C_D$) to the other input of said second coincidence gate circuit, a negator device adapted to produce an output pulse representing the digit "one" in the absence of an input pulse, circuit means connecting the output of said second buffer circuit to the input of said negator device, a third coincidence gate circuit having an input to which are applied the pulses (A), (B) and ($C_D$) to produce at its output a pulse representing the digit "one" whenever a pulse occurs simultaneously in the (A), (B) and $C_D$) trains, a third buffer circuit including at least one thermionic valve with its input connected to the outputs of said negator device and said third coincidence gate circuit, a fourth buffer circuit including at least one thermionic valve to the input of which are applied the pulse trains (A), (B) and ($C_D$), a fourth coincidence gate circuit, circuit means connecting the output of said third buffer circuit to one input of said fourth coincidence gate circuit, circuit means connecting the output of said fourth buffer circuit to the other input of said fourth coincidence gate circuit, and an output line for said $(A+B)$ train connected to the output of said fourth coincidence gate circuit.

2. A circuit arrangement for producing from two input trains (A) and (B), each representing by its succession of pulses the digits of a binary number and fed thereto on separate input lines simultaneously digit by digit, a final output pulse train $(A+B)$ representing by its succession of pulses the digits of the binary sum of the two numbers, said circuit arrangement comprising a first coincidence gate circuit fed with trains (A) and (B) to produce at its output a pulse representing the digit "one" whenever pulses representing the digit "one" occur simultaneously in trains (A) and (B), a first buffer circuit including at least one thermionic tube with its input connected to both the (A) and (B) input lines, a second coincidence gate circuit, circuit means connecting the output of said first buffer circuit to one input of said second coincidence gate circuit, a second buffer circuit including at least one thermionic tube, circuit means connecting the input of said second buffer circuit to the outputs of said first and second coincidence gate circuits, a delay circuit connected to the output of said second buffer circuit to delay by one digit period the pulses (C) derived from said second buffer circuit, means for applying the delayed pulses ($C_D$) to the other input of said second coincidence gate circuit, a negator device for producing an output pulse representing the digit "one" in the absence of an input pulse at any digit position of said pulse trains, circuit means connecting the output of said second buffer circuit to the input of said negator device, a third buffer circuit including at least one thermionic tube having an input to which are applied the pulses ($C_D$) and the output of said first buffer circuit, a third coincidence gate circuit, circuit means connecting the output of said negator device to one input of said third coincidence gate circuit, circuit means connecting the output of said third buffer circuit to the other input of said third coincidence gate circuit, a fourth coincidence gate circuit to one input of which is applied the output of said first coincidence gate and to another input of which is applied said pulses ($C_D$) a fourth buffer circuit including at least one thermionic valve to the input of which are applied the outputs of said third and fourth coincidence gate circuits, and an output line for said $(A+B)$ train connected to the output of said fourth buffer circuit.

3. A circuit arrangement for producing from two input pulse trains (A) and (B), each representing by its succession of pulses the digits of a binary number and fed thereto on separate input lines simultaneously digit by digit, a final output pulse train $(A+B)$ representing by its succession of pulses the digits of the binary sum of the two numbers, said circuit arrangement comprising a first double diode AND type gate circuit having two input terminals fed respectively with said trains (A) and (B) and an output terminal, a first double diode OR type gate circuit having two input terminals supplied respectively with said trains (A) and (B) and an output terminal, a second double diode AND type gate circuit having two input terminals and an output terminal, one of said input terminals of said second AND type gate circuit being connected to the output terminal of said first OR type gate circuit, a second double diode OR type gate circuit having two input terminals and an output terminal, one of said input terminals of said second OR type gate circuit being connected to the output terminal of said first AND gate type circuit and the other of said input terminals being connected to the output terminal of said second AND type gate circuit, a negator device having input and output terminals and producing an output signal representing the digit "1" during each digit interval period of the input pulse trains in the absence of an input pulse to its input terminal during such interval, a delay device having input and output terminals for delaying pulses applied thereto by a time interval equal to one digit interval period of the input pulse trains, circuit means connecting the output of said second OR type gate circuit to said input terminal of said negator device and to the input terminal of said delay device to provide a series of delayed pulses ($C_D$), a triple diode AND type gate circuit having three input terminals supplied respectively with said trains (A), (B) and ($C_D$) and an output terminal, a third double diode OR type gate circuit having two input terminals and an output terminal, said input terminals of said third OR type gate circuit being connected respectively to the output terminal of said negator device and the output terminal of said triple diode AND type gate circuit, a triple diode OR type gate circuit having three input terminals and an output terminal, said input terminals being supplied respectively with said (A), (B) and ($C_D$) pulse trains, a fourth double diode AND type gate circuit having two input terminals and an output terminal, said input terminals of said fourth AND type gate circuit being connected respectively to the output terminal of said triple diode OR type gate circuit and the output terminal of said third OR type gate circuit and a sum-representing signal output terminal connected to the output terminal of said fourth AND type gate circuit.

4. A circuit arrangement for producing from two input pulse trains (A) and (B) each representing by its succession of pulses the digits of a binary number and fed thereto on separate input lines simultaneously digit by digit a final output pulse train $(A+B)$ representing by its succession of pulses the digits of the binary sum of the two numbers, said circuit arrangement comprising a first double diode AND type gate circuit having two input terminals fed respectively with said trains (A) and (B) and an output terminal, a first double diode OR type gate circuit having two input terminals supplied respectively with said trains (A) and (B) and an output terminal, a second double diode AND type gate circuit having two input terminals and an output terminal, one of said input terminals of said second AND type gate circuit being connected to the output terminal of said first OR type gate circuit and the other of said input terminals being supplied with a pulse signal ($C_D$) comprising carry-over digit signals from the immediately preceding addition operation, a second double diode OR type gate circuit having two input terminals and an output terminal, one of said input terminals of said second OR type gate circuit being connected to the output terminal of said first AND type gate circuit and the other of said input terminals being connected to the output terminal of said second AND type gate circuit, a negator device having an input and an output terminal and producing an output signal representing the digit "1" during each digit interval period of the input pulse trains in the absence of an input pulse to its input terminal during each such interval, circuit means connecting the output of said second OR type gate circuit to said input terminal of said negator device, a triple diode AND type gate circuit having three input terminals supplied respectively with said pulse trains (A), (B) and ($C_D$), a third double diode type OR gate circuit having two input terminals and an output terminal, said input terminals of said third OR type gate circuit being connected respectively to the output terminal of said negator device and the output terminal of said triple diode AND type gate circuit, a triple diode OR type gate circuit having three input terminals and an output terminal, said input terminals of said triple diode OR type gate circuit being supplied respectively with said (A), (B) and ($C_D$) pulse trains, a fourth double diode AND type gate circuit having two input terminals and an output terminal, said input terminals of said fourth AND type gate circuit being connected respectively to the output terminal of said triple diode OR type gate circuit and the output terminal of said third OR type gate circuit and a sum-representing signal output terminal connected to the output terminal of said fourth AND type gate circuit.

5. A circuit arrangement for producing from two input pulse trains (A) and (B), each representing by its succession of pulses the digits of a binary number and fed thereto on separate input lines simultaneously digit by digit, a final output pulse train $(A+B)$ representing by its succession of pulses the digits of the binary sum of the two numbers, said circuit arrangement comprising a first double diode AND type gate circuit having two input terminals fed respectively with said trains (A) and (B) and an output terminal, a first double diode OR type gate circuit having two input terminals supplied respectively with said trains (A) and (B) and an output terminal, a second double diode AND type gate circuit having two input terminals and an output terminal, one of said input terminals being connected to the output terminal of said first OR type gate circuit and the other of said input terminals being supplied with a pulse signal train ($C_D$) comprising carry-over digit signals from the immediately preceding addition operation, a second double diode OR type gate circuit having two input terminals and an output terminal, one of said input terminals being connected to the output terminal of said first AND type gate circuit and the other of said input terminals being connected to the output terminal of said second AND type gate circuit, a negator device having an input terminal and an output terminal and producing an output signal representing the digit "1" during each digit interval period of the input pulse trains in the absence of an input pulse to its input terminal during each such interval, a delay device having input and output terminals for delaying pulses applied thereto by a time interval equal to one digit interval period of the input pulse trains, circuit means connecting the output terminal of said second OR type gate circuit to said input terminal of said negator device and to the input terminal of said delay device to provide said carry-over pulse train ($C_D$) at the output terminal of said delay device, a third double diode OR type gate circuit having two input terminals connected respectively to the output terminals of said first OR type gate circuit and said output terminal of said delay device and an output terminal, a third double diode AND type gate circuit having two input terminals connected respectively to the output terminal of said negator device and the output terminal of said third OR type gate circuit, a fourth double diode AND type gate circuit having two input terminals connected respectively to the output terminal of said first AND type gate circuit and the output terminal of said delay device, a fourth double diode OR type gate circuit having two input terminals connected respectively to the output terminal of said fourth AND type gate circuit and the output terminal of said third AND type gate circuit and a sum-representing signal output terminal connected to the output terminal of said fourth OR type gate circuit.

6. A circuit arrangement for producing from two input pulse trains (A) and (B), each representing by its succession of pulses the digits of a binary number and fed thereto on separate input lines simultaneously digit by digit, a final output pulse train $(A+B)$ representing by its succession of pulses the digits of the binary sum of the two numbers, said circuit arrangement comprising a first double diode AND type gate circuit having two input terminals fed respectively with said trains (A) and (B) and an output terminal, a first double diode OR type gate circuit having two input terminals supplied respectively with said trains (A) and (B) and an output terminal, a second double diode AND type gate circuit having two input terminals and an output terminal, one of said input terminals being connected to the output terminal of said first OR type gate circuit and the other of said input terminals being supplied with a pulse signal train ($C_D$) comprising carry-over digit signals from the preceding adding operation, a second double diode OR type gate circuit having two input terminals and an output terminal, one of said input terminals being connected to the output terminal of said first AND type gate circuit and the other of said input terminals being connected to the output terminal of said second AND type gate circuit, a negator device having an input terminal and an output terminal and producing an output signal representing the digit "1" during each digit interval period of the input pulse trains in the absence of an input pulse to its input terminal during each such interval, circuit means connecting the output terminal of said second OR type gate circuit to said input terminal of said negator device, a third double diode OR type gate circuit having two input terminals and an output terminal, one of said input terminals being connected to the output terminal of said first OR type gate circuit and the other of said input terminals being supplied with said pulse train ($C_D$), a third double diode AND type gate circuit having two input terminals and an output terminal, said input terminals being connected respectively to the output terminal of said negator device and the output terminal of said third OR type gate circuit, a fourth double diode AND type gate circuit having two input terminals and an output terminal, one of said input terminals being connected to the output terminal of said first AND type gate circuit and the other input terminal being supplied with said ($C_D$) pulse train, a fourth double diode OR type gate circuit having two input terminals and an output terminal, said input terminals being connected respectively to the output terminal of said fourth AND type gate circuit and the output terminal of said third AND type gate circuit and a sum-representing signal output terminal connected to the output terminal of said fourth OR type gate circuit.

7. A circuit arrangement for effecting binary addition of two numbers each represented by serial pulse trains (A) and (B) wherein binary digit value "1" is signalled by the presence of a pulse in any of a number of successive digit interval times and wherein the binary value "0" is signalled by the absence of a pulse during such digit interval times and which comprises first and second input terminals for receiving respectively said input pulse trains (A) and (B) and a third terminal receiving a train of delayed carry pulses ($C_D$) derived during the preceding addition operation, a three-input AND gate having its inputs connected respectively to said first, second and third terminals, a three-input OR gate having its inputs connected respectively to said first, second and third terminals, a first two-input AND gate having its input terminals connected respectively to said first and second input terminals, a first two-input OR gate having its input terminals connected to said first and second input terminals, a second two-input AND gate having one of its input terminals connected to the output of said first two-input OR gate and having the other of its input terminals connected to said third terminal, a second two-input OR gate having one of its inputs connected to the output of said first two-input AND gate and the other of its inputs connected to the output of said second two-input AND gate, a delay device imposing a delay equal to one of said digit interval time periods of said pulse trains and having its input connected to the output of said second two-input OR gate and having its output connected to said third terminal, a negator device producing an output pulse representative of digit "1" in each digit interval in the absence of an applied input pulse thereto during that interval, said negator device having its input connected to the output of said second two-input OR gate, a third two-input OR gate having one of its inputs connected to the output of said negator device and the other of its inputs connected to the output of said three-input AND gate, a third two-input AND gate having one of its inputs connected to the output of said three-input OR gate and the other of its inputs connected to the output of said third two-input OR gate and a sum-representing signal output terminal connected to the output of said third two-input AND gate.

8. A circuit arrangement for effecting binary addition of two numbers each represented by serial pulse trains (A) and (B) wherein binary digit value "1" is signalled by the presence of a pulse in any of a number of successive digit interval times and wherein the binary value "0" is signalled by the absence of a pulse during such digit interval times and which comprises first and second input terminals for receiving respectively said input pulse trains (A) and (B) and a third terminal receiving a train of delayed carry pulses ($C_D$) derived during the preceding addition operation, a three-input AND gate having its inputs connected respectively to said first, second and third terminals, a three-input OR gate having its inputs connected respectively to said first, second and third terminals, a first two-input AND gate having its input terminals connected respectively to said first and second input terminals, a first two-input OR gate having its input terminals connected to said first and second input terminals, a second two-input AND gate having one of its input terminals connected to the output of said first two-input OR gate and having the other of its input terminals connected to said third terminal, a second two-input OR gate having one of its inputs connected to the output of said first two-input AND gate and the other of its inputs connected to the output of said second two-input AND gate, a negator device producing an output pulse representative of digit "1" in each digit interval in the absence of an applied input pulse thereto during that interval, said negator device having its input connected to the output of said second two-input OR gate, a third two-input OR gate having one of its inputs connected to the output of said negator device and the other of its inputs connected to the output of said three-input AND gate, a third two-input AND gate having one of its inputs connected to the output of said three-input OR gate and the other of its inputs connected to the output of said third two-input OR gate and a sum-representing signal output terminal connected to the output of said third two-input AND gate.

9. A circuit arrangement for effecting binary addition of two numbers each represented by serial pulse trains (A) and (B) wherein binary digit value "1" is signalled by the presence of a pulse in any of a number of successive digit interval times and wherein the binary value "0" is signalled by the absence of a pulse during such digit interval times and which comprises first and second terminals for receiving respectively the input pulse trains (A) and (B), a third terminal receiving a train of delayed carry pulses ($C_D$) derived within the circuit arrangement, a first two-input AND gate having its inputs connected respectively to said first and second terminals, a first two-input OR gate having its inputs connected respectively to said first and second terminals, a second two-input AND gate having one of its inputs connected to the output of said first two-input OR gate and the other of its inputs connected to said third terminal, a second two-input OR gate having one of its inputs connected to the output of said first two-input AND gate and the other of its inputs connected to the output of said second two-input AND gate, a delay device imposing a time delay upon signals applied thereto equal to one digit interval time of said pulse trains, said delay device having its input connected to the output of said second two-input OR gate and having its output connected to said third terminal, a negator device producing an output pulse representing digit value "1" in any digit interval time in the absence of an input pulse applied thereto during that same interval time, said negator device having its input connected to the output of said second two-input OR gate, a third two-input OR gate having one of its inputs connected to the output of said first two-input OR gate and the other of its inputs connected to said third terminal, a third two-input AND gate having one of its inputs connected to the output from said negator device and the other of its inputs connected to the output from said third two-input OR gate, a fourth two-input AND gate having one of its inputs connected to the output of said first two-input AND gate and the other of its inputs connected to said third terminal, a fourth two-input OR gate having one of its inputs connected to the output of said fourth two-input AND gate circuit and the other of its inputs connected to the output of said third two-input AND gate and a sum-representing signal output terminal connected to the output of said fourth two-input OR gate.

10. A circuit arrangement for effecting binary addition of two numbers each represented by serial pulse trains (A) and (B) wherein binary digit value "1" is signalled by the presence of a pulse in any of a number of successive digit interval times and wherein the binary value "0" is signalled by the absence of a pulse during such digit interval times and which comprises first and second terminals for receiving respectively the input pulse trains (A) and (B), a third terminal receiving a train of delayed carry pulses ($C_D$) derived within the circuit arrangement, a first two-input AND gate having its inputs connected respectively to said first and second terminals, a first two-input OR gate having its inputs connected respectively to said first and second terminals, a second two-input AND gate having one of its inputs connected to the output of said first two-input OR gate and the other of its inputs connected to said third terminal, a second two-input OR gate having one of its inputs connected to the output of said first two-input AND gate and the other of its inputs connected to the output of said second two-input AND gate, a negator device producing an output pulse representing digit value "1" in any digit interval time in the absence of an input pulse applied thereto during that same interval time, said negator device having its input connected to the output of said second two-input OR gate, a third two-input OR gate having one of its inputs connected to the output of said first two-input OR gate and the other of its inputs connected to said third terminal, a third two-input AND gate having one of its inputs connected to the output from said negator device and the other of its inputs connected to the output from said third two-input OR gate, a fourth two-input AND gate having one of its inputs connected to the output of said first two-input AND gate and the other of its inputs connected to said third terminal, a fourth two-input OR gate having one of its inputs connected to the output of said fourth two-input AND gate circuit and the other of its inputs connected to the output of said third two-input AND gate and a sum-representing signal output terminal connected to the output of said fourth two-input OR gate.

11. A circuit arrangement according to claim 3 wherein said pulse trains (A), (B) and ($C_D$) comprise negative-going pulses for signalling the binary digit value "1" and wherein each of the diodes in each of said AND type gate circuits has its anode connected to the related input terminal and its cathode directly connected to said output terminal of said gate circuit, there being also a source of negative potential and a load resistor connected between said output terminal and said source of negative potential, and wherein also each of the diodes in each of said OR type gate circuits has its cathode connected to the related input terminal and its anode directly connected to said output terminal of said gate circuit, there being also for each gate circuit a source of positive potential and a load resistor connected between said output terminal and said source of positive potential.

12. A circuit arrangement according to claim 5 wherein said pulse trains (A), (B) and ($C_D$) comprise negative-going pulses for signalling the binary digit value "1" and wherein each of the diodes in each of said AND type gate circuits has its anode connected to the related input terminal and its cathode directly connected to said output terminal of said gate circuit, there being also a source of negative potential and a load resistor connected between said output terminal and said source of negative potential, and wherein also each of the diodes in each of said OR type gate circuits has its cathode connected to the related input terminal and its anode directly connected to said output terminal of said gate circuit, there being also for each gate circuit a source of positive potential and a load resistor connected between said output terminal and said source of positive potential.

13. A circuit arrangement according to claim 7 wherein said pulse trains (A), (B) and ($C_D$) comprise negative-going pulses for signalling the binary digit value "1" and wherein each of said AND gates comprises a plurality of unilaterally conductive devices, one for each input, the anode forming terminal of each device being connected to the associated input and the cathode forming terminals of all the devices being interconnected to form an output terminal, a source of negative potential, and a load resistor connected between said output terminal and said source of negative potential, and wherein each of said OR gates comprises a plurality of unilaterally conductive devices, one for each input, the cathode forming terminal of each device being connected to the associated input and the anode forming terminals of all the devices being interconnected to form an output terminal, a source of positive potential and a load resistor connected between said output terminal and said source of positive potential.

14. A circuit arrangement according to claim 9 wherein said pulse trains (A), (B) and ($C_D$) comprise negative-going pulses for signalling the binary digit value "1" and wherein each of said AND gates comprises a plurality of unilaterally conductive devices, one for each input, the anode forming terminal of each device being connected to the associated input and the cathode forming terminals of all the devices being interconnected to form an output terminal, a source of negative potential, and a load resistor connected between said output terminal and said source of negative potential, and wherein each of said OR gates comprises a plurality of unilaterally conductive devices, one for each input, the cathode forming terminal of each device being connected to the associated input and the anode forming terminals of all the devices being interconnected to form an output terminal, a source of positive potential and a load resistor connected between said output terminal and said source of positive potential.

References Cited in the file of this patent

UNITED STATES PATENTS

| Number | Name | Date |
| --- | --- | --- |
| 2,404,250 | Rajchman | July 16, 1946 |
| 2,425,131 | Snyder | Aug. 5, 1947 |
| 2,429,227 | Herbst | Oct. 21, 1947 |
| 2,429,228 | Herbst | Oct. 21, 1947 |
| 2,445,215 | Flory | July 13, 1948 |

OTHER REFERENCES

"First Draft of a Report on the EDVAC," John Von Neuman, Moore School of Electrical Engineering, University of Pennsylvania, June 30, 1945; pages 24–29 (May 23, 1947).

"Progress Report (2) on the EDVAC," Moore School of Electrical Engineering, University of Pa., June 30, 1946, declassified February 13, 1947; Fig. 13—1 on page 1—1—14A.